United States Patent
Bean et al.

(10) Patent No.: US 6,899,933 B2
(45) Date of Patent: May 31, 2005

(54) SPLICING TAPE WITH SEPARATING PORTIONS

(75) Inventors: Jason A. Bean, Saco, ME (US); Koichi Nakamura, Pleasant Prairie, WI (US)

(73) Assignees: Permacel, North Brunswick, NJ (US); Nitto Denko Corporation, Osaka (JP)

( * ) Notice: Subject to any disclaimer, the term of this patent is extended or adjusted under 35 U.S.C. 154(b) by 0 days.

(21) Appl. No.: 10/274,268

(22) Filed: Oct. 21, 2002

(65) Prior Publication Data

US 2004/0045658 A1 Mar. 11, 2004

Related U.S. Application Data

(60) Provisional application No. 60/408,879, filed on Sep. 9, 2002.

(51) Int. Cl.[7] .................................................. B32B 3/00
(52) U.S. Cl. ................ 428/40.1; 242/555.3; 242/556.1; 428/41.7; 428/42.2; 428/42.3; 428/43; 428/57; 428/194; 428/202
(58) Field of Search ............................... 428/40.1, 42.2, 428/42.3, 43, 57, 194, 41.7, 202; 242/555.3, 556.1

(56) References Cited

U.S. PATENT DOCUMENTS

| | | |
|---|---|---|
| 1,996,497 A | 4/1935 | Wood |
| 2,089,469 A | 8/1937 | Dix |
| 2,149,832 A | 3/1939 | Bernard |
| 2,149,833 A | 3/1939 | Bernard |
| 2,172,776 A | 9/1939 | Scott |
| 2,320,657 A | 6/1943 | Rosen |
| 2,377,971 A | 6/1945 | Rosen |
| 2,812,145 A | 11/1957 | Meloche |
| 2,920,835 A | 1/1960 | Gibson |
| 3,231,949 A | 2/1966 | Phipps |
| 3,243,337 A | 3/1966 | Haselow et al. |

(Continued)

FOREIGN PATENT DOCUMENTS

| | | |
|---|---|---|
| CA | 2025473 A1 | 9/1989 |
| DE | 3834334 A1 | 4/1990 |
| EP | 0 555 772 A1 | 8/1993 |
| EP | 0 574 869 A2 | 12/1993 |
| EP | 1 223 133 A1 | 7/2002 |
| GB | 1 504 286 | 3/1978 |
| GB | 2 079 628 A | 1/1982 |
| GB | 2 257 931 A | 1/1993 |
| WO | WO 90/08032 A1 | 7/1990 |
| WO | WO 94/25381 A1 | 11/1994 |
| WO | WO 95/05989 A1 | 3/1995 |

*Primary Examiner*—Nasser Ahmad
(74) *Attorney, Agent, or Firm*—Sughrue Mion, PLLC

(57) ABSTRACT

A splicing tape (100) is provided having a base layer (10), an adhesive layer (20) on the top of the base layer (10), a first adhesive strip (30*a*) and a second adhesive strip (30*b*) on the bottom of the base layer (10), and a two lines of separating portions (50*a* and 50*b*) in the base layer (10). A splicing tape (100*a*) is also provided having a base layer (10*a*), a top adhesive (20*a*) on the top of the base layer (10) with detackified portions (14*a* and 15*a*), and a bottom adhesive (30*c*) on the bottom of the base layer (10*a*) with a detackified portion (23*a*), and first and second lines of separating portions (50*a* and 50*b*) in the base layer (10*a*). The line of separating portions (50*a* or 50*b*) can include perforations having a ratio of perforation length to space between perforations between a ratio of 4 to 6 and a ratio of 9 to 1.

36 Claims, 6 Drawing Sheets

U.S. PATENT DOCUMENTS

| | | |
|---|---|---|
| 3,503,568 A | 3/1970 | Galley |
| 3,547,739 A | 12/1970 | Beute |
| 3,767,039 A | 10/1973 | Schroter |
| 3,915,399 A | 10/1975 | Kron |
| 4,564,150 A | 1/1986 | Keene et al. |
| 4,575,017 A | 3/1986 | Pali |
| 4,704,315 A | 11/1987 | McClintock |
| 4,905,924 A | 3/1990 | Moore |
| 5,212,002 A | 5/1993 | Madrzak et al. |
| 5,275,344 A | 1/1994 | Ray |
| 5,277,731 A | 1/1994 | Krimsky et al. |
| 5,301,891 A | 4/1994 | Dugay |
| 5,318,656 A | 6/1994 | Dylla et al. |
| 5,323,981 A | 6/1994 | Dionne |
| 5,332,607 A | 7/1994 | Nakamura et al. |
| 5,348,793 A | 9/1994 | Stettner |
| 5,356,496 A | 10/1994 | Linclon et al. |
| 5,397,076 A | 3/1995 | Padilla |
| 5,692,699 A | 12/1997 | Weirauch et al. |
| 5,916,651 A | 6/1999 | Wienberg et al. |
| 5,996,927 A | 12/1999 | Weirauch et al. |
| 6,416,604 B1 | 7/2002 | Nootbaar et al. |
| 6,432,241 B1 | 8/2002 | Congard et al. |
| 2002/0056784 A1 | 5/2002 | Davies et al. |

SPLICING TAPE WITH SEPARATING PORTIONS

This application claims the benefit of U.S. Provisional Application No. 60/408,879, filed Sep. 9, 2002, the disclosure of which is incorporated herein by reference.

TECHNICAL FIELD

This invention generally relates to a splicing tape. A splicing tape can be, for example, used as a flying splice for splicing a new roll of paper to a running web sheet of a depleting roll of paper. The splicing tape is attached to both the bottom side (i.e., inside) of the top (i.e, outer) sheet of the new roll and the top side (i.e., outside) of the next to the top sheet of the new roll, as well as to one side of a running web or sheet of a depleting roll.

BACKGROUND

A conventional splicing tape, such as that disclosed in U.S. Pat. No. 6,416,604, includes a paper backing, two double-sided adhesive layers (a first adhesive layer on top of the backing and a second adhesive layer on the bottom of the backing), a shorter splittable layer of paper provided below the second adhesive layer, and a third double sided adhesive layer provided below the splittable layer. The splittable layer of paper is designed to split into separate upper and bottom portions once the internal bonding forces (also known in the art as the Scott bond) due to the chemical composition and structure of the paper are exceeded.

In such a conventional splicing tape, the third adhesive layer is attached to the top side of the next to the top sheet of the new roll of paper and the second adhesive layer is attached to the top side of the top sheet of the new roll of paper. When the new roll of paper is brought into contact with the running web of an expiring or depleting roll, the exposed side of the first adhesive layer contacts and adheres to the running web. The resulting separating force due to the movement of the running web with respect to the new roll of paper overcomes the internal bonding forces of the splittable paper layer, causing this layer to split along a plane parallel to the adhesive layers, leaving the top sheet of the new roll of paper spliced to the running web.

As described above, the splittable paper layer splits when the splicing tape is subject to a predetermined force that exceeds the internal bonding forces. Therefore, the consistent performance of a conventional splicing tape that uses a splittable paper layer is highly dependent on the Scott bond consistency of the stock paper used for this layer. Therefore, this type of conventional splittable adhesive tape has limited applications, since, in order to provide conventional splicing tapes adapted for use in multiple splicing applications that produce different separating forces, a different paper stock having a particular Scott bond must be selected for each application, which is costly.

European Patent Application EP 1 223 133, which is incorporated herein by reference in its entirety, discloses a splicing tape, including a backing layer coated on its lower and upper sides with a double-sided adhesive layer. Cleavage means or perforations extend in a transverse direction through the upper side adhesive layer and the backing layer. The cleavage means divides the backing layer into first and second portions, and the adhesive layer on the lower side extends along only one edge and partially across the width of the splicing tape so as not to extend over the second portion. The perforations provided in the backing layer allow a designer to control the force required to split the adhesive tape. When placed on a new roll, the splicing tape according to EP 1 223 133 tends to fold over, making it difficult to properly prepare the new roll for a splicing operation, and requiring the operator to possess a high level of skill.

The present invention is directed to overcoming one or more of the problems as set forth above.

SUMMARY OF THE INVENTION

It is, therefore, desirable to provide an adhesive splicing tape for carrying out a flying splice that requires very little operator skill. It is also desirable for this splicing tape to be easily adapted or manufactured for different applications involving different amounts of force for splitting the tape.

In one aspect of the invention, a splicing tape is provided having a base layer; an adhesive layer on the top of the base layer; a first adhesive strip and a second adhesive strip on the bottom of the base layer; and a two lines of separating portions or cleavage means in the base layer.

According to another aspect of the invention, a splicing tape is provided having a base layer; a top adhesive layer on the top of the base layer; and a bottom adhesive layer on the bottom of the base layer; and first and second lines of separating portions in the base layer. The top adhesive includes a first detackified portion that extends from a first longitudinal edge of the base layer to the first line of separating portions or extends from the first longitudinal edge of the base layer and overlaps the first line of separating portions, and a second detackified portion that extends from a second longitudinal edge of the base layer to the second line of separating portions or extends from the second longitudinal edge of the base layer and overlaps the second line of separating portions. The bottom adhesive layer includes a third detackified portion that extends at least from the first line of separating portions to the second line of separating portions.

According to another aspect of the invention, a splicing tape is provided having a base layer; an adhesive layer on the top of the base layer; a first adhesive strip on the bottom of the base layer; and a line of separating portions in the base layer. The first line of separating portions are perforations having a ratio of perforation length to space between perforations between 4 to 6 and 9 to 1.

According to still another aspect of the invention, a method of splicing a new paper roll to a depleting web is provided having the steps of providing a splicing tape, such as one of the splicing tapes described above, providing a new roll of paper; providing a depleting web; attaching the splicing tape to the new roll; and attaching the splicing tape to the depleting web.

BRIEF DESCRIPTION OF THE DRAWINGS

The advantages, nature and various additional features of the invention will appear more fully upon consideration of the illustrative embodiment of the invention which is schematically set forth in the drawings, in which:

FIG. 2b shows an A—A cross-section of the splicing tape shown in FIG. 2a;

DETAILED DESCRIPTION

Figure 1:
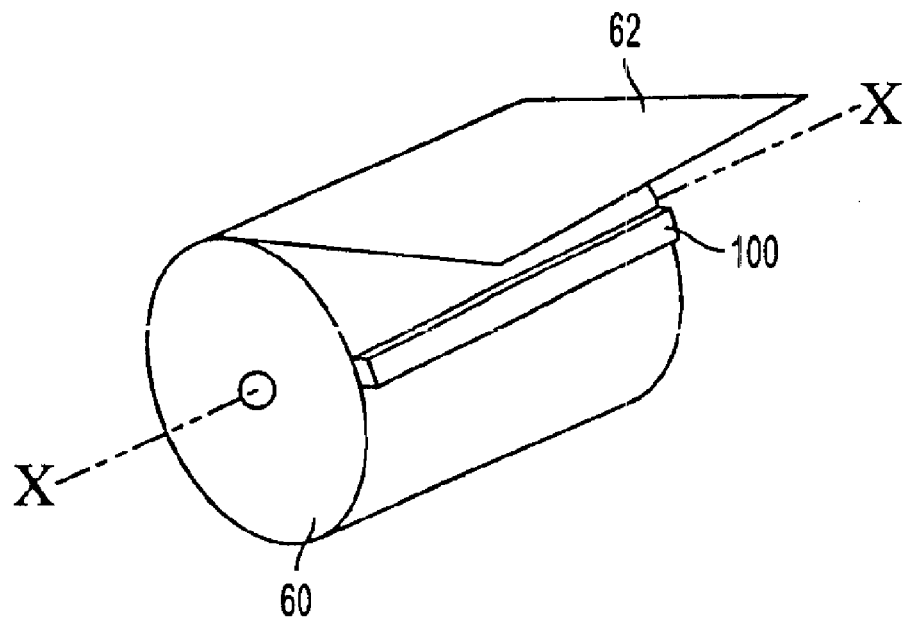
FIG. 1 shows the splicing tape applied to the top side of the next to the top sheet of a new roll of paper in accordance with an embodiment of the present invention.

While the invention is open to various modifications and alternative forms, specific embodiments thereof are shown by way of examples in the drawings and are described herein in detail. There is no intent to limit the invention to the particular forms disclosed.

FIG. 1 shows a first embodiment of the splicing tape 100 applied to the top of a new paper roll 60.

Figure 2A:
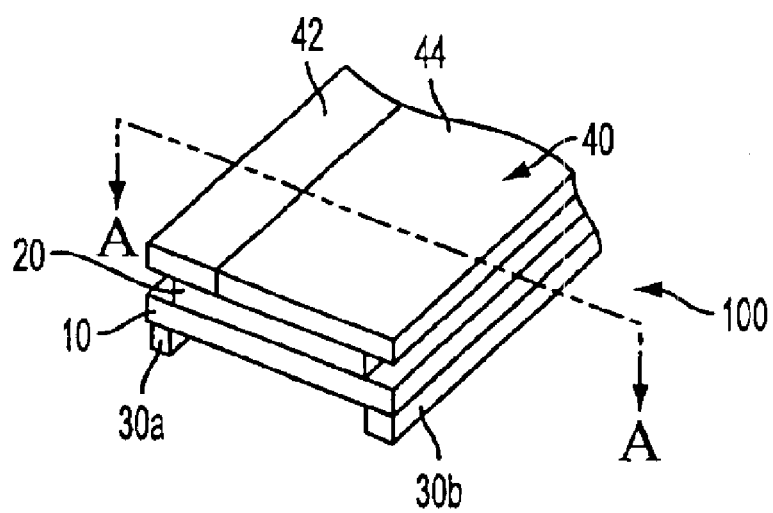
FIG. 2a shows the splicing tape in accordance with an embodiment of the present invention.
Figure 2B:
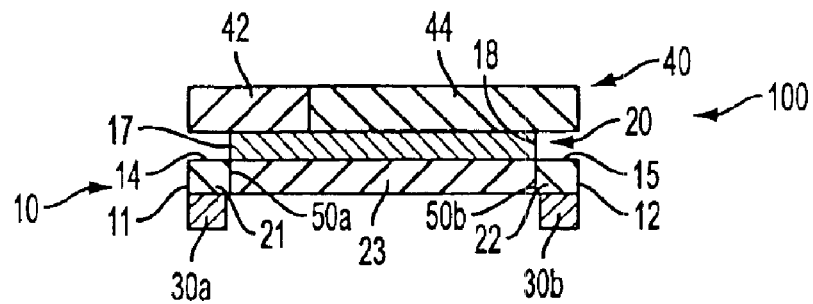

FIGS. 2a and 2b show the first embodiment of the splicing tape 100. The splicing tape 100 includes a base layer 10, an adhesive layer 20 on top of the base layer 10, two adhesive strips 30a and 30b on the bottom of the base layer 10 near or at respective opposing longitudinal edges 11 and 12 of the base layer 10 that run in the longitudinal direction of the adhesive strips 30a and 30b, and a removable liner 40 on top of the adhesive layer 20. Two lines of separating portions 50a and 50b are provided in the base layer 10. The separating portions 50a and 50b can be, for example, weakening portions such as full or partial perforations in the base layer, or the scoring of this layer.

The two adhesive strips 30a and 30b are used to prevent the splicing tape from folding over when applied to a new roll. That is, if only a single adhesive strip is disposed on a longitudinal edge of the bottom of the base layer 20, then the other edge of the splicing tape tends to fold over (i.e., fall forward) when the splicing tape is adhered to the roll. When this occurs, the splicing tape will no longer be in the proper position for splicing the new roll 60 to a depleting roll, requiring an experienced operator to reposition the splicing tape. On the other hand, when the two strips 30a and 30b are used, in combination with two sets of separating portions 50a and 50b, even an inexperienced operator can properly position the adhesive splicing tape 100 without the risk of having the tape fold over, and, therefore, without the need to reposition the splicing tape.

The splicing tape 100 can be made as follows. Base layer 10 is made of a paper, a film, or a thin metal foil. Some non-limiting examples of papers that can be used are non-woven paper, splittable paper, or crepe paper. Some non-limiting examples of films that can be used are Polyethyleneterephthalate, Polyvinylchloride, Polypropylene, Polyethylene, or Polyvinylalcohol. Some non-limiting examples of thin metal foils that can be used are aluminum or copper. The base layer 10 is cut to a desired size.

Adhesive layer 20 and adhesive strips 30a and 30b can be made by casting adhesive of a desired size on the base layer 10 directly or by laminating double sided adhesive tape or transfer adhesive tape on the base layer 10.

A release liner 40 is placed on top of the adhesive layer 20. The liner 40 can be a single piece, or it may be made into two sections 42 and 44. The liner 40 may be cut by, for example, a hard die or a laser cutter to form the two sections 42 and 44, prior to or after the placement of the top liner 40 on top of the adhesive layer 20. The adhesive strips 30a and 30b are adhered to the backside of the base layer 10 at respective positions next to or near the first and second longitudinal edges 11 and 12 of the base paper 10, respectively.

The adhesive layer 20 is adhered to the top of the base layer 10. The adhesive layer 20 is sized to be the same width or a smaller width than the distance between the lines of separating portions 50a and 50b on the base layer 10. When the adhesive layer 20 is adhered to the base layer 10, free portions 14 and 15 on top of the base layer 10 are left between the respective edges 11 and 12 of the base layer 10 and corresponding longitudinal edges 17 and 18 of the adhesive layer 20. The width of the first free portion 14 on top of the base layer 10 is greater than or equal to the distance between the first longitudinal edge 11 of the base layer 10 and the corresponding separating portion 50a. The width of the second free portion 15 on top of the base layer 10 is greater than or equal to the distance between the second longitudinal edge 12 of the base layer 10 and the corresponding separating portion 50b. As used herein, the term "width" refers to the distance taken in a direction orthogonal to the longitudinal direction of the splicing tape 100.

Separating portions 50a and 50b are formed in the base layer 10 in the longitudinal direction of the base layer 10. The first adhesive strip 30a is located at or near the first longitudinal edge 11 of the base layer 10 and has a width equal or less than the width from the first longitudinal edge 11 to the first line of separating portions 50a. The second adhesive strip 30b is located at or near the second longitudinal edge 12 of the base layer 10 and has a width equal or less than the width from the second longitudinal edge 12 to the second line of separating portions 50b.

The separating portions 50a and 50b divide the base layer 10 into three sections 21, 22, and 23. Section 21 is defined as the portion of the base layer between the edge 11 of the base layer 10 and the separating portion 50a.

The width of section 21 between the opposite edge 11 of the base layer 10 and the separating portion 50a is at least as large as the width of the adhesive strip 30a, but not greater than the distance between the edge 11 of the base layer 10 and the corresponding edge 17 of the adhesive layer 20. Section 22 is defined as the portion of the base layer between the opposite edge 12 of the base layer 10 and the separating portion 50b. The width of section 22 between the opposite edge 12 of the base layer 10 and the separating portion 50b is at least as large as the width of the adhesive strip 30b, but not greater than the distance between the edge 12 of the base layer 10 and the corresponding edge 18 of the adhesive layer 20.

Section 23 is the main portion of the base layer between separating portions 50a and 50b. The width of section 23 is greater than or equal to the width of the adhesive layer 20. Stated otherwise, the width of the adhesive layer 20 should not extend across the separating portions 50a and 50b. That is, the width of the adhesive layer 20 should be between the separating portions 50a and 50b.

The base layer 10, adhesive layer 20, adhesive strips 30a and 30b, and the liner 40 are preferably the same length (or cut to the same length) in the longitudinal direction of the splicing tape as the width of the paper rolls that are spliced by the adhesive splicing tape 100. Typically, the paper rolls can be, for example, from 20 inches to 250 inches, the larger size rolls being used in paper mills.

Figure 2C:
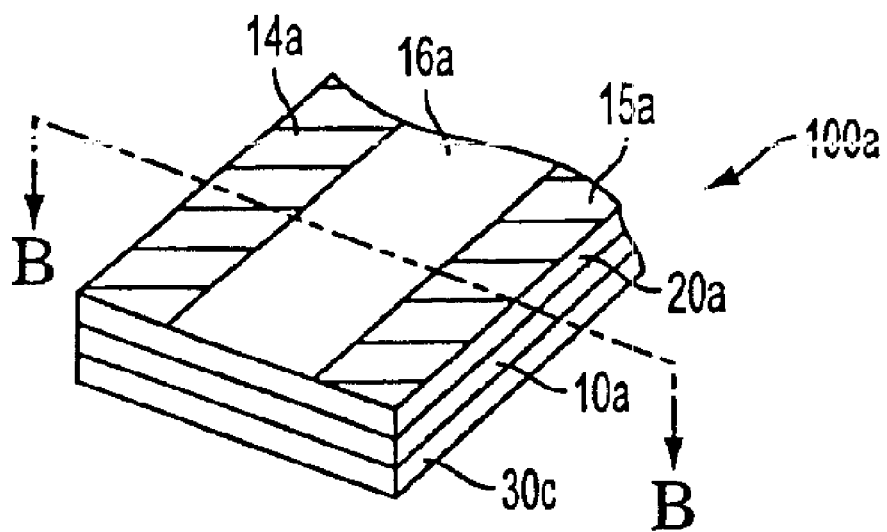
FIG. 2c shows the splicing tape in accordance with another embodiment of the present invention.
Figure 2D:
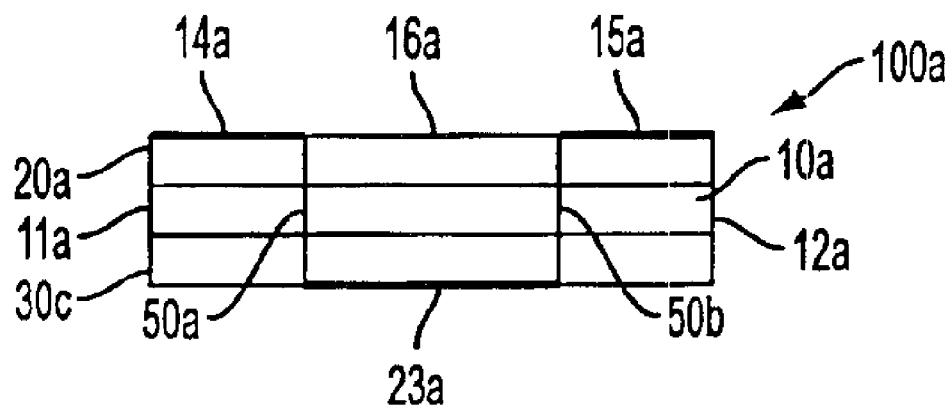
FIG. 2d shows a B—B cross section of the splicing tape shown in FIG. 2c.

FIGS. 2c and 2d show a second embodiment of the splicing tape 100a. In this embodiment, one side (top side) of the base layer 10a is coated or laminated with a top adhesive layer or adhesive material 20a, and the other side of the base layer 10a is coated or laminated with a bottom adhesive layer or adhesive material 30c. The base layer 10a has two lines of separating portions 50a and 50b, which may also extend through the top adhesive layer 20a and the bottom adhesive layer 30c. The surface of the top adhesive layer 20a is then "detackified" on a first detackified portion 14a, which extends from the first longitudinal edge 11a of the base layer 10a to or beyond (i.e., overlays) the first line of separating portions 50a; and detackified on a second detackified portion 15a, which extends from the second longitudinal edge 12a of the base layer 10a to or beyond (i.e., overlays) the first second line of separating portions 50b. This leaves a remaining tacky portion 16a between the two detackified portions 14a and 15a on the top surface of the top adhesive layer 20a. Non-limiting examples of detackifiying are laminating thin paper or film on the base layer 10a or by coating the base layer 10a with paint or the like.

The bottom adhesive 30c is then detackified on a third detackified portion 23a. The third detackifed portion 23a extends at least from the first line of separating portions 50a to the second line of separating portions 50b, and can extend beyond either or both of the lines of separating portions 50 and 50b. A liner, which can be a single liner 40 or have separate portions 42 and 44, may be applied to the tacky portion 16a.

Figure 3:
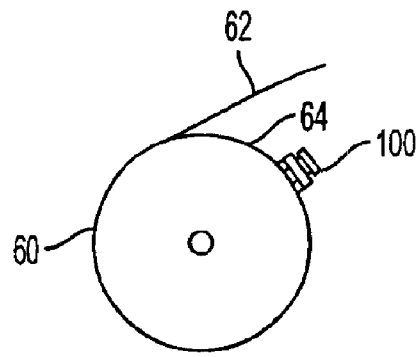
FIGS. 3–5 show a method of splicing a new roll to a running web using the splicing tape in accordance with an embodiment of the present invention.
Figure 4:
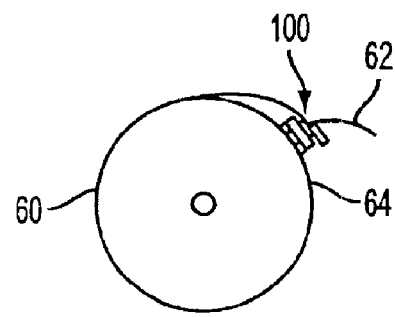
Figure 5:
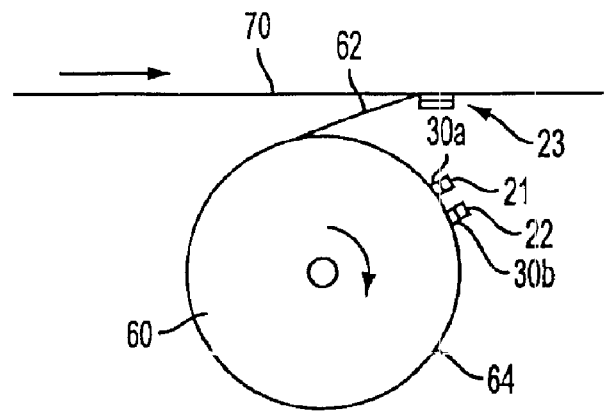

FIGS. 3–5 show a preferred method of splicing a new roll 60 to a running web 72 of a depleting roll. The Figures make reference to the first embodiment of the invention, but the second embodiment can be applied in a similar fashion.

In FIG. 3, the top sheet 62 of a new roll 60 is lifted up and the adhesive strips 30a and 30b of the adhesive splicing tape 100 are applied on the top side of the next to the top sheet 64 of the roll 60. Preferably, the splicing tape 100 is placed across the roll 60 at a slight angle. The angle helps to increase the "zipper effect" or the breaking action of the separating portions 50a and 50b.

Next, as shown in FIG. 4, the smaller section 42 of the liner 40 is removed and the top sheet 62 is pulled down and smoothed across the exposed part of a first part of the adhesive layer 20. Any portion of the top sheet 62 that extends beyond the exposed part of the adhesive layer 20 is then folded back along this line and may be torn off.

Figure 6A:
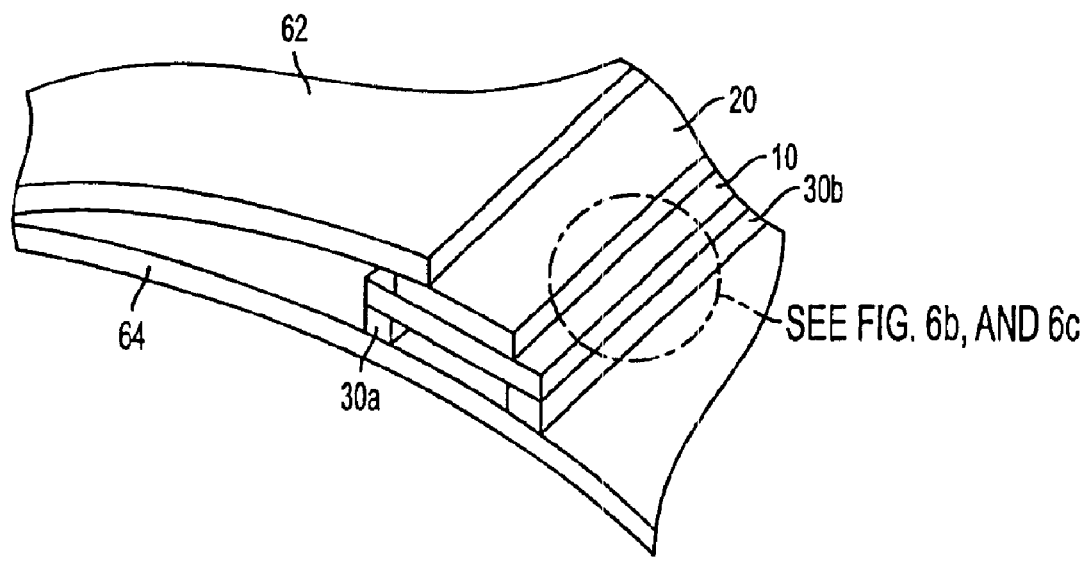
FIG. 6a shows the splicing tape applied to a new roll of paper ready to be spliced to a running web in accordance with an embodiment of the invention.

The larger section 44 of the liner 40 is removed just before the adhesive splicing tape 100 is ready to be adhered to a running web sheet 70. The splicing tape at this step is shown in FIG. 6a.

At this stage, the new roll 60 is rotated about its longitudinal axis X—X so that the peripheral speed of the top sheet 62 is the same as or close to the speed of the running web 70. Then one or both the new roll 60 and the running web 70 are moved toward each other until the running web 70 is adhered to the adhesive splicing tape 100 at the exposed surface of a second part of the adhesive layer 20 where the larger section 44 was removed.

Figure 6B:
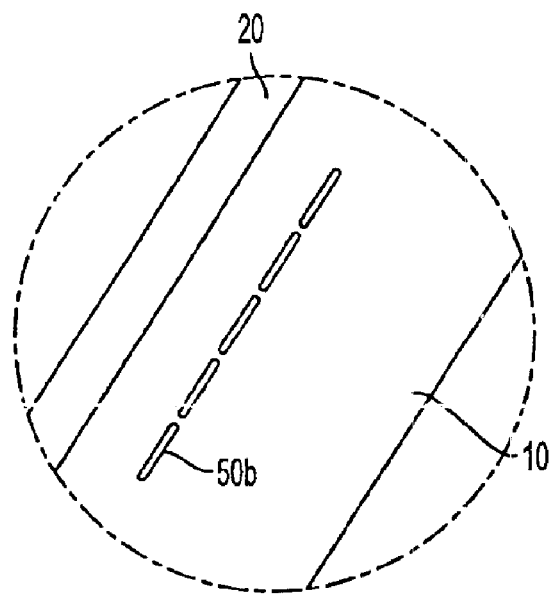
FIGS. 6b and 6c are partial top views showing perforations in the base layer of the splicing tape in accordance with an embodiment of the present invention.
Figure 6C:
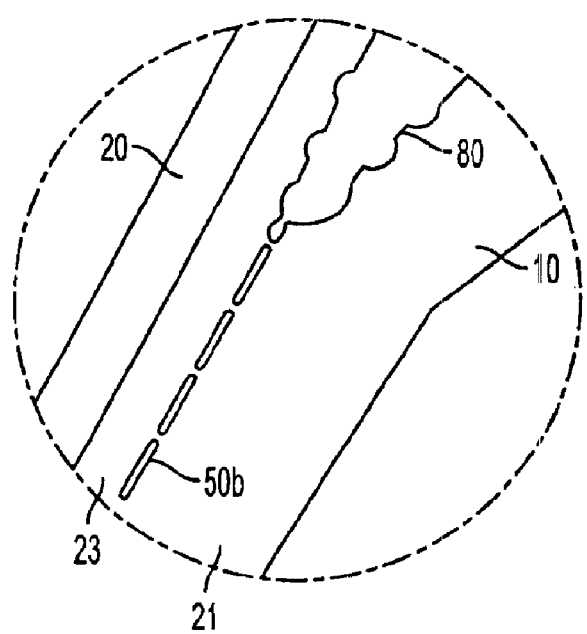

As is shown in FIG. 5, when the splicing tape 100 is adhered to the running web 70, the force of the running web 70 causes the perforations 50a and 50b in the base layer 10 to tear, or "pop", separating the third section 23 of the splicing tape 100 from the adhesive strips 30a and 30b and corresponding sections 21 and 22, which remain attached to the next to the top sheet 64 of the roll 60. In the case when the separating portions 50a and 50b are lines of perforations, lines of teeth 80 are formed in sections 21 and 22, as shown in FIGS. 6b and 6c.

The new roll 60 is generally wound so as to be applied in a left to right application, but this can be altered to offer ease for left-handed operators.

In one tested example of the first embodiment, the adhesive layer 20 and adhesive strips 30a and 30b are made from water soluble double-coated tape, and the base layer 10 is made from a non-woven paper, but the invention is not limited in this respect. In the tested embodiment the base layer 10 is 64 mm wide, the adhesive layer 20 is 48 mm wide, the adhesive strips 30a and 30b are each 6 mm wide, and the release liner 40 has a total width of 64 mm. Section 42 of the release liner 44 has a width of 19 mm, and section 44 has a width of 45 mm. The separating portions 50a and 50b are lines of perforations located 6 mm from the longitudinal edges 11 and 12 of the base layer 10, respectively.

In the tested embodiment, the perforations are each 7 mm long and spaced 3 mm apart from one another, i.e., the ratio of perforation to space between perforations is approximately 7 to 3 as shown in FIG. 6a. The length of the perforations 50a and 50b and the space between these perforations govern the amount of force necessary to separate the main portion 23 of the splicing tape 100 from the smaller sections 21 and 22, with lines of teeth 80 remaining attached to these smaller sections 21 and 22. For example, using longer perforations, or alternatively longer spaces between the perforations, reduces the force necessary to detach the main portion from the smaller sections. Also, the spaces between the perforations act in an elastic manner when subject to a force, which increases the perforations resistance to pre-bursting when the new roll is stored prior to splicing, and the environmental conditions surrounding the new roll, such as humidity and temperature, change while it is stored.

In order to achieve the balance between perforations that pre-burst and perforations that do not separate properly, the length of the perforation itself may be 1 to 30 mm, preferably 3 to 10 mm, and the ratio of the perforations to the space between the perforations is from a ratio of 4 to 6 to a ratio of 9 to 1, preferably a ratio of 5 to 5 to a ratio of 8 to 2.

Also, adjustment of the tear strength, tensile strength, elongation influence to the resistance against dynamic shear strength, and the ease of the separation of the portions 21 and 22 from the base layer 10 are controlled by selection of an appropriate material for the base layer 10. Of the non-limiting examples of material that can be used as the base layer 10, paper is the easiest material to adjust in order to provide the desired range of tear strength, tensile, and elongation.

The perforation pattern of the splicing tape 100 is designed so that the perforations will "pop" when the force of the running web 70 is applied to the tape 100, but do not "pop" to soon, i.e. pre-burst, when the tape 100 is merely attached to the new roll 60 and waiting to be adhered to a running web 70.

Pre-bursting is at times caused by an increase in the moisture content of the roll 60. Typically, a roll of paper has a low moisture content, but is capable of holding additional moisture. When the roll is exposed to air, which has a higher moisture content, the moisture content of the roll increases. When the moisture content of the roll increases, the roll expands. This expansion can create a dynamic shear force on the top sheet of the roll, causing the perforations to pre-burst.

Using two adhesive strips 30a and 30b with two separating portions 50a and 50b provides a splicing tape with the strength and elasticity to resist this dynamic shear force.

In addition, using a base layer 10 made of paper structured to soak water immediately, such as a non-woven paper, provides advantages for water base ink application. As described earlier and shown in FIG. 5, after the adhesive splicing tape 100 has been used to splice a depleting roll to a new roll 60, the adhesive strips 30a and 30b and first and second sections 21 and 22 of the base layer 10 remain attached to the top of a running web of the new roll 60.

Typically, paper production includes multiple print stations that apply water-based ink to the paper of the rolls. This ink is set to the paper by drying the ink in an oven. The drying of the paper, however, also significantly reduces the moisture content of the paper, which leaves the paper in a brittle state. Therefore, the paper is subsequently re-moisturized.

If the splicing tape 100 is made of typical sized paper that is not structured to soak water immediately due to sizing, then the lines of teeth left over on top of the paper web act as a dam and collect excessive moisture. The excessive moisture creates a weakened area in the paper web, which is prone to breaking. The use of a paper structured to soak water immediately as a base paper 10 reduces the damming affect of the adhesive strips 30a and 30b and first and second sections 21 and 22 of the base layer 10 that remain attached to the next to the top layer 64. It is preferred that the base layer 10 is made of a paper that reaches its maximum water absorption amount within 3 seconds after it is immersed in water.

Figure 7:
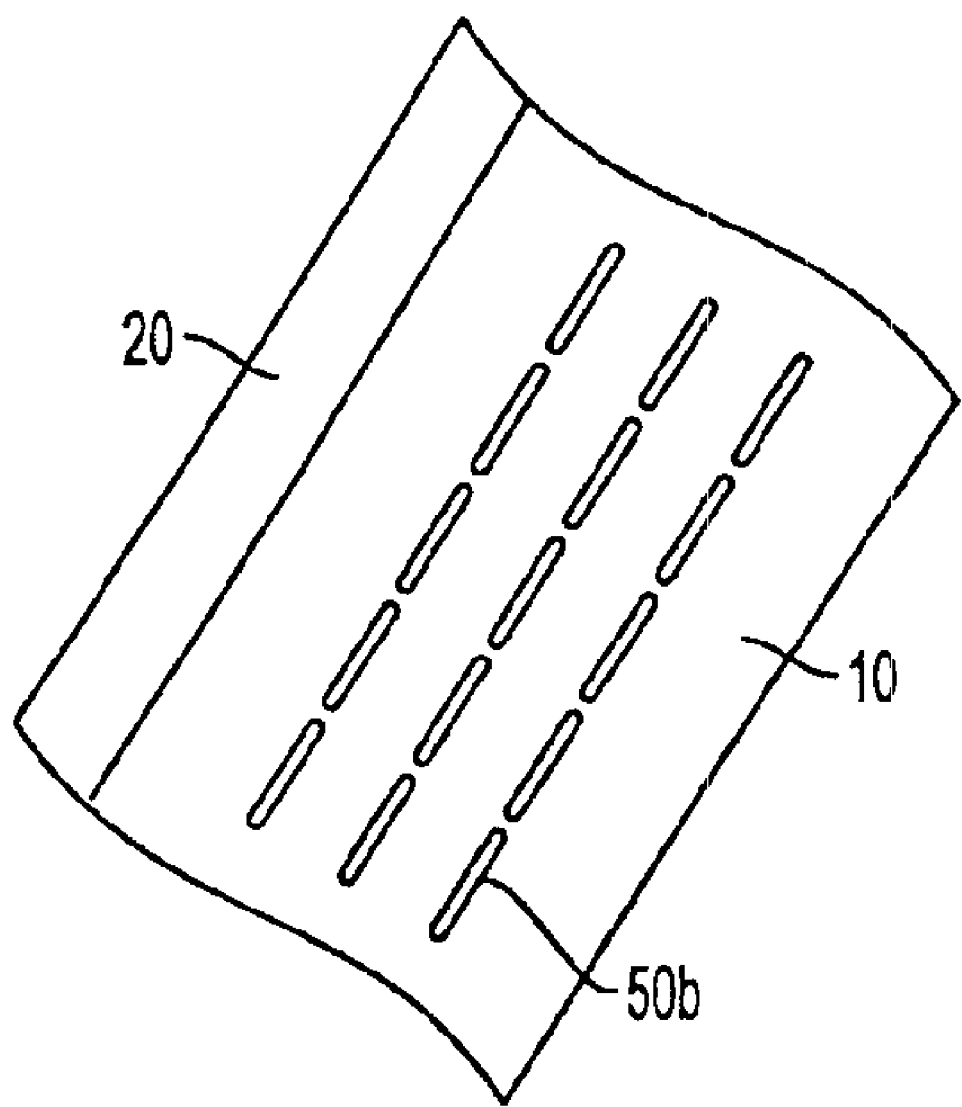
FIG. 7 is a partial top view showing multiple lines of perforations in the base layer in accordance with an embodiment of the invention.

It is of course understood that departures can be made from the preferred embodiment of the invention by those of ordinary skill in the art without departing from the spirit and scope of the invention that is limited only by the following claims. For example, one or both of the lines of separating portions 50a and 50b can be sets of multiple lines of perforations, as is shown in FIG. 7 or micro-perforations, i.e. perforations with a diameter of less than or equal to 3 mm at an interval between perforations of less than or equal to 3 mm. Single or multiple lines of micro-perforations can be used.

What is claimed is:

1. A splicing tape, comprising:
    a base layer having a length and a width, wherein the length is greater than the width;
    an adhesive layer on a top of the base layer;
    a first adhesive strip on a bottom of the base layer, and a second adhesive strip on the bottom of the base layer; wherein the first and the second adhesive strips continuously extend substantially along the length of the base layer;
    a first line of separating portions and a second line of separating portions in the base layer;
    wherein and the first and second lines of separating portions extend substantially along the length of the base layer; wherein the first adhesive strip is located substantially between the first line of separating portions and a first longitudinal edge of the base layer; and the second adhesive strip is located substantially between the second line of separating portions and a second longitudinal edge of the base layer located opposite the first longitudinal edge of the base layer.

2. The splicing tape according to claim 1, wherein the width of the adhesive layer is less than or equal to a distance between the first line of separating portions and the second line of separating portions, such that the adhesive layer does not extend across the first and second lines of separating portions.

3. The splicing tape according to claim 2, wherein the first adhesive strip is located between the first line of separating portions and a first longitudinal edge of the base layer; and
    the second adhesive strip is located between the second line of separating portions and a second longitudinal edge of the base layer located opposite the first longitudinal edge of the base layer.

4. The splicing tape of claim 1, wherein the first and second adhesive strips are located at positions not under the adhesive layer.

5. The splicing tape according to claim 1, wherein the first and second lines of separating portions comprise perforations in the base layer.

6. The splicing tape according to claim 5, wherein the perforations have a ratio of perforation length to space between perforations between a ratio of 4 to 6 and a ratio of 9 to 1 and the perforations have a length of 1 to 30 mm.

7. The splicing tape according to claim 1, further comprising a liner on top of the adhesive layer.

8. The splicing tape according to claim 7, wherein the liner includes a first liner portion and a second liner portion, the first liner portion separable from the second liner portion.

9. The splicing tape according to claim 8, further comprising a cut between the first liner portion and the second liner portion, so that first liner portion is separable from the second liner portion.

10. The splicing tape according to claim 1, wherein the base layer is made of paper structured to soak water which can reach to its maximum water absorption amount within 3 seconds after it is inunersed in water.

11. The splicing tape according to claim 1, wherein the base layer is made of a non-woven paper.

12. The splicing tape according to claim 1, wherein at least one of the first line of separating portions and the second line of separating portions comprise multiple lines of perforations.

13. The splicing tape according to claim 1, wherein at least one of the first line of separating portions and the second line of separating portions comprises microperforations.

14. The splicing tape according to claim 1, wherein the first and second lines of separating portions are perforations having a ratio of perforation length to space between perforations between a ratio of 4 to 6 and a ratio of 9 to 1.

15. The splicing tape according to claim 14, wherein the first adhesive strip is located between the first line of separating portions and a first longitudinal edge of the base layer; and
    the second adhesive strip is located between the second line of separating portions and a second longitudinal edge of the base layer located opposite the first longitudinal edge of the base layer.

16. A splicing tape, comprising:
    a base layer having a length and a width wherein the length is greater than the width;
    a top adhesive layer on a top of the base layer; and
    a bottom adhesive layer on a bottom of the base layer, and
    a first line of separating portions and a second line of separating portions in the base layer;
    wherein the top adhesive layer includes a first detackifled portion that extends from a first longitudinal edge of the base layer to the first line of separating portions or extends from the first longitudinal edge of the base layer and overlaps the first line of separating portions, and a second detackified portion that extends from a second longitudinal edge of the base layer to the second line of separating portions or extends from the second longitudinal edge of the base layer and overlaps the second line of separating portions; and wherein the bottom adhesive layer includes a third detackified portion that extends at least from the first line of separating portions to the second line of separating portions;

wherein the first and second detackified portions continuously extend substantially alone the length of the base layer; and the first and second lines of separating portions extend substantially along the length of the base layer.

17. The splicing tape according to claim 16, wherein the first and second lines of separating portions comprise perforations in the base layer.

18. The splicing tape according to claim 17, wherein the perforations have a ratio of perforation length to space between perforations between a ratio of 4 to 6 and a ratio of 9 to 1, and the perforations have length of 1 to 30 mm.

19. A method of splicing a new paper roll to a depleting web, comprising the steps of:

providing the splicing tape of claim 1;
providing the roll;
providing a depleting web;
attaching the splicing tape to the roll; and
attaching the splicing tape to the depleting web.

20. The method of splicing a new paper roll to a depleting web according to claim 19, wherein the step of attaching the splicing tape to the roll, includes:

attaching the first adhesive strip and the second adhesive strip to a next to a top sheet of the roll, and
attaching a first part of the adhesive layer to the top sheet of the roll.

21. The method of splicing a new paper roll to a depleting web according to claim 20, wherein the splicing tape further comprises a liner on the adhesive layer, and, wherein the liner includes a first liner portion and a second liner portion; and wherein the step of removing the liner includes:
removing the first liner portion before attaching the first part of the adhesive layer to the top sheet of the roll;
removing the second liner portion; and
attaching a second part of the adhesive layer to the running web.

22. A combination of a splicing tape and a roll, comprising: the roll; and the splicing tape, including
a base layer;
an adhesive layer on a top of the base layer;
a first adhesive strip on a bottom of the base layer, and a second adhesive strip on the bottom of the base layer; and
a first line of separating portions and a second line of separating portions in the base layer;

wherein the splicing tape is positioned on the roll such that the first and second adhesive strips extend substantially parallel to an axis of rotation of the roll and the first and second adhesive strips continuously extend substantially parallel to the axis of the roll; wherein the first adhesive strip is located substantially between the first line of separating portions and a first longitudinal edge of the base layer; and the second adhesive strip is located substantially between the second line of separating portions and a second longitudinal edge of the base layer located opposite the first longitudinal edge of the base layer.

23. The combination according to claim 22, wherein the width of the adhesive layer is less than or equal to a distance between the first line of separating portions and the second line of separating portions, such that the adhesive layer does not extend across the first and second lines of separating portions.

24. The combination according to claim 23, wherein the first adhesive strip is located between the first line of separating portions and a first longitudinal edge of the base layer; and the second adhesive strip is located between the second line of separating portions and a second longitudinal edge of the base layer located opposite the first longitudinal edge of the base layer.

25. The combination according to claim 22, wherein the first and second adhesive strips are located at positions not under the adhesive layer.

26. The combination according to claim 22, wherein the first and second lines of separating portions comprise perforations in the base layer.

27. The combination according to claim 22, wherein the splicing tape extends substantially an entire length of the roll.

28. The combination of claim 22, further comprising a liner on top of the adhesive layer, wherein the liner includes a first liner portion and a second liner portion, and a cut between the first liner portion and the second liner portion, so that first liner portion is separable from the second liner portion; and wherein the cut extends substantially in a direction of an axis of rotation of the roll.

29. A combination of a splicing tape and a roll, comprising: the roll; and the splicing tape, including
a base layer;
a top adhesive layer on a top of the base layer; and
a bottom adhesive layer on a bottom of the base layer, and
a first line of separating portions and a second line of separating portions in the base layer;
wherein the top adhesive layer includes a first detackifled portion that extends from a first longitudinal edge of the base layer to the first line of separating portions or extends from the first longitudinal edge of the base layer and overlaps the first line of separating portions, and a second detackified portion that extends from a second longitudinal edge of the base layer to the second line of separating portions or extends from the second longitudinal edge of the base layer and overlaps the second line of separating portions; and
wherein the bottom adhesive layer includes a third detackified portion that extends at least from the first line of separating portions to the second line of separating portions;
wherein first and second lines of separating portions extend substantially parallel to an axis of rotation of the roll and the first and second detackified portions continuously extend substantially parallel to an axis of rotation of the roll.

30. The splicing tape according to claim 29, wherein the first and second lines of separating portions comprise perforations in the base layer.

31. The combination of claim 29, wherein the splicing tape extends substantially an entire length of the roll.

32. The combination of claim 31, further comprising a liner on top of the adhesive layer,
   wherein the liner includes a first liner portion and a second liner portion, and a cut between the first liner portion and the second liner portion, so that first liner portion is separable from the second liner portion; and
   wherein the cut extends substantially parallel to an axis of rotation of the roll.

33. A method of splicing a roll to a depleting web, comprising the steps of:
   providing the splicing tape of claim 16,
   providing the roll;
   providing a depleting web;
   attaching the splicing tape to the roll; and
   attaching the splicing tape to the depleting web.

34. The method according to claim 33, wherein the first and second lines of separating portions comprise perforations in the base layer.

35. The splicing tape of claim 16, further comprising a liner on top of a tackified portion of said top adhesive layer, wherein the liner includes a first liner portion and a second liner portion, the first liner portion separable from the second liner portion.

36. The splicing tape of claim 35, further comprising a cut between the first liner portion and the second liner portion, so that first liner portion is separable from the second liner portion.

* * * * *